United States Patent
Shuma et al.

(10) Patent No.: US 9,710,186 B2
(45) Date of Patent: Jul. 18, 2017

(54) PERFORMING ONLINE DATA MIGRATION WITH CONCURRENT ACTIVE USER ACCESS TO THE DATA

(71) Applicant: CA, Inc., Islandia, NY (US)

(72) Inventors: Kevin P. Shuma, Celina, TX (US); Robert Florian, Dallas, TX (US); Joseph Lynn, Plano, TX (US)

(73) Assignee: CA, Inc., New York, NY (US)

( * ) Notice: Subject to any disclaimer, the term of this patent is extended or adjusted under 35 U.S.C. 154(b) by 177 days.

(21) Appl. No.: 14/309,942

(22) Filed: Jun. 20, 2014

(65) Prior Publication Data

US 2015/0370505 A1  Dec. 24, 2015

(51) Int. Cl.
*G06F 12/00* (2006.01)
*G06F 3/06* (2006.01)

(52) U.S. Cl.
CPC .......... *G06F 3/0647* (2013.01); *G06F 3/0604* (2013.01); *G06F 3/067* (2013.01); *G06F 2003/0697* (2013.01)

(58) Field of Classification Search
CPC ...... G06F 3/0647; G06F 3/0604; G06F 3/067; G06F 2003/0697
See application file for complete search history.

(56) References Cited

U.S. PATENT DOCUMENTS

| 6,356,977 B2* | 3/2002 | Ofek | G06F 3/0607 |
| | | | 709/217 |
| 8,812,806 B2* | 8/2014 | Fredricksen | G06F 17/30079 |
| | | | 707/602 |
| 2006/0212671 A1* | 9/2006 | Todd | G06F 3/061 |
| | | | 711/165 |

* cited by examiner

*Primary Examiner* — Gurtej Bansal
(74) *Attorney, Agent, or Firm* — Coats & Bennett, PLLC

(57) ABSTRACT

A network server migrates dataset blocks from a source storage device to a target storage device while continuing to service user requests for the data stored in the dataset blocks. A control driver executing at the network server tracks the location of the dataset blocks during the data migration as being at either the source storage device or the target storage device. Upon receiving a user request for the data, the control driver uses the tracking information to determine whether the dataset blocks associated with the requested data have been migrated to the target storage device or are still stored at the source storage device. The control driver then retrieves the data associated with the requested dataset blocks from the determined source or target storage device.

18 Claims, 15 Drawing Sheets

PERFORMING ONLINE DATA MIGRATION WITH CONCURRENT ACTIVE USER ACCESS TO THE DATA

BACKGROUND

The present disclosure relates generally to computing devices associated with databases, and more particularly to computing devices configured to migrate or transfer data from a source storage device to a target storage device.

Mass storage devices are currently able to store large amounts of data. Such devices are utilized, for example, by local and federal governments, the military, and large and small businesses. Although these entities utilize their data in different ways, most entities utilize the mass storage devices to track and maintain the data associated with their customers, employees, and inventory.

Initially, a Database Administrator (DBA) may architect a given database on a storage device having adequate resources and capabilities to allow the database to grow or expand. Such devices include, but are not limited to, Direct Access Storage Devices (DASD), for example. Eventually, however, the resources available at such storage devices may no longer be able to support the database. Thus, the DBA may be required to move or migrate the data to a new storage device having better capabilities and/or more resources.

Conventionally, in some instances, migrating large datasets from one storage device to another storage device requires taking the database "off-line." In these cases, however, end users that need the information cannot access the data while the data is being migrated. Rather, the users must wait until the data migration is complete and then interact with the data stored at the new storage device. In other instances, the database remains online so that the end users can continue to access the data. Such conventional methods require performing an additional synchronization process during and/or after the data migration is complete.

BRIEF SUMMARY

The present disclosure provides a method and apparatus for migrating data between storage devices while concurrently servicing user requests to retrieve and update that data.

In one embodiment, a network server is configured to operate in a data migration mode in which the server migrates a plurality of dataset blocks (e.g., blocks of information) comprising a dataset from a source storage device to a target storage device. The source and target storage devices are communicatively connected to the network server via a communications network. While the server is migrating the plurality of dataset blocks, the server receives a data request for data that is part of the dataset being migrated. Responsive to receiving the request, the server determines a current memory location for a dataset block comprising requested data. The current memory location will be at the source storage device if the dataset block has not yet been migrated, and at the target storage device if the dataset block has been migrated. Once the current memory location of the data is determined, the server retrieves the dataset block comprising the requested data while continuing to migrate the plurality of dataset blocks from the source storage device to the target storage device.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
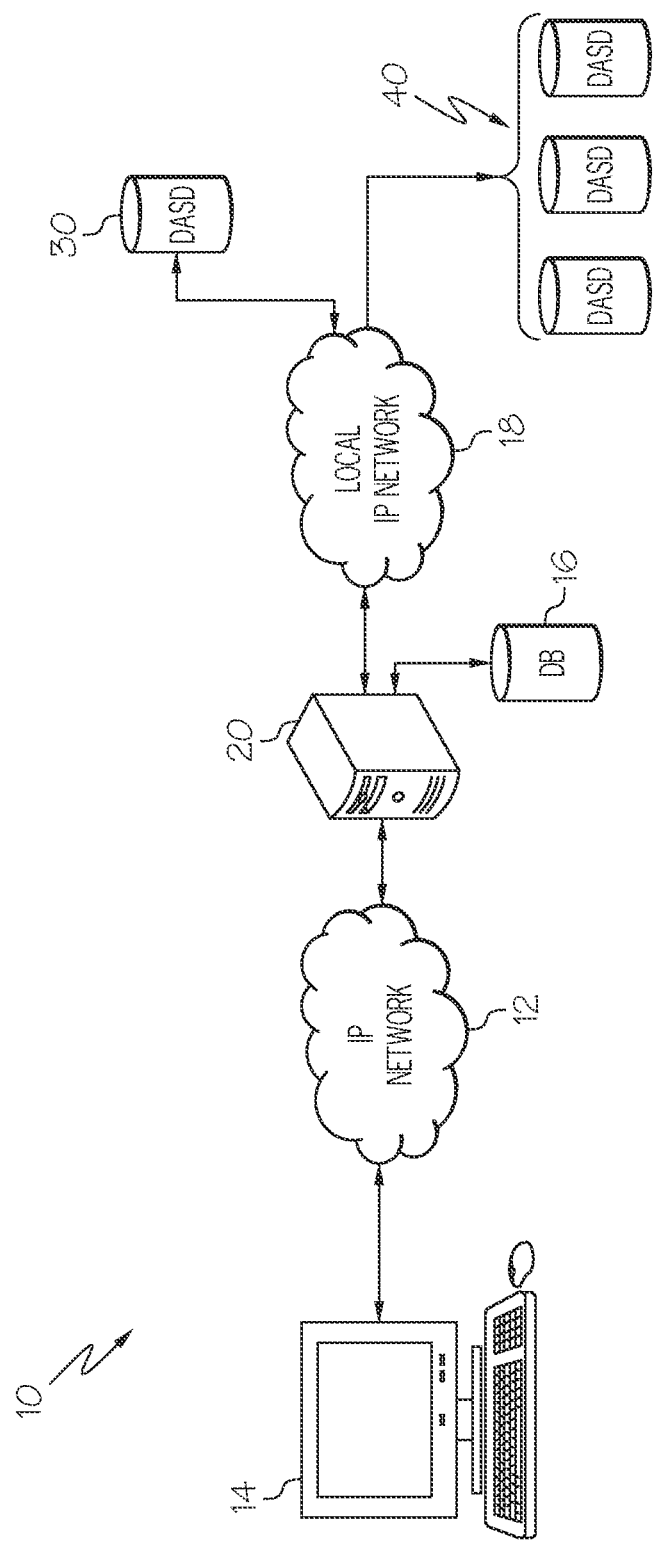
FIG. 1 is a block diagram illustrating some components of a communications system 10 configured according to one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages such as assembler. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, the present disclosure provides a network server and corresponding computer-implemented method for migrating or copying data stored at a source storage device, such as a Direct Access Storage Device (DASD), for example, to a target storage device (e.g., another DASD) while concurrently handling user requests for the data. More specifically, the network server leaves the data structures that store the data (e.g., tables) in an open state while migrating the data to the target storage device. This allows end users to continue to retrieve and update the most current version of the data without a service interruption and regardless of whether the data is located at the source or target storage device. Moreover, according to the present disclosure, such continuing, uninterrupted access is transparent to the end users.

The method may be employed by a Database Administrator (DBA) or other network operator, for example, in situations where a storage device that currently stores a user database (i.e., the source storage device) can no longer provide adequate support for the database. For example, the current storage device may no longer be able to provide the necessary resources for users to interact with the database, or the database may have simply grown to be larger than the current storage device can handle. Whatever the reason for the migration of data, the method of the present disclosure permits users to access the data during the data migration process without placing the database in an "off-line" mode, and without performing lengthy and costly data synchronization processes during or after the data migration process.

Turning now to the drawings, FIG. 1 is a block diagram illustrating a communications system 10 configured according to one embodiment of the present disclosure. As seen in FIG. 1, an IP network 12 (e.g., the Internet) communicatively connects one or more end user terminals 14 to a network server 20 having a local memory device 16. As described in more detail later, the network server 20 is configured according to the present disclosure to migrate or transfer data between storage devices while also allowing for the concurrent retrieval and updates to the data being moved. The data to be migrated may be stored at the local memory device 16, for example, or at one or more other storage devices 30, 40 connected to the network server 20 via one or more public and/or private IP networks 18.

It should be noted that FIG. 1 illustrates the local memory device 16 and the storage devices 30, 40 as comprising separate devices. However, those of ordinary skill in the art should readily appreciate that the embodiments of the present disclosure are not so limited. In other embodiments, the local memory 16 and the storage devices 30, 40 are all connected to the network server 20.

In operation, user terminal 14 generates a request for data and sends the request to the network server 20 via IP network 12. Upon receipt, the network server retrieves the requested data from one or more of the storage devices 16, 30, and 40, and returns the requested data in a response message to user terminal 14. Additionally, according to embodiments of the present disclosure, the network server 20 is configured to control the migration of data from one of the storage devices 16, 30, 40 to another of the storage devices 16, 30, 40 concurrently with the user access and without taking the database off-line.

Figure 2:
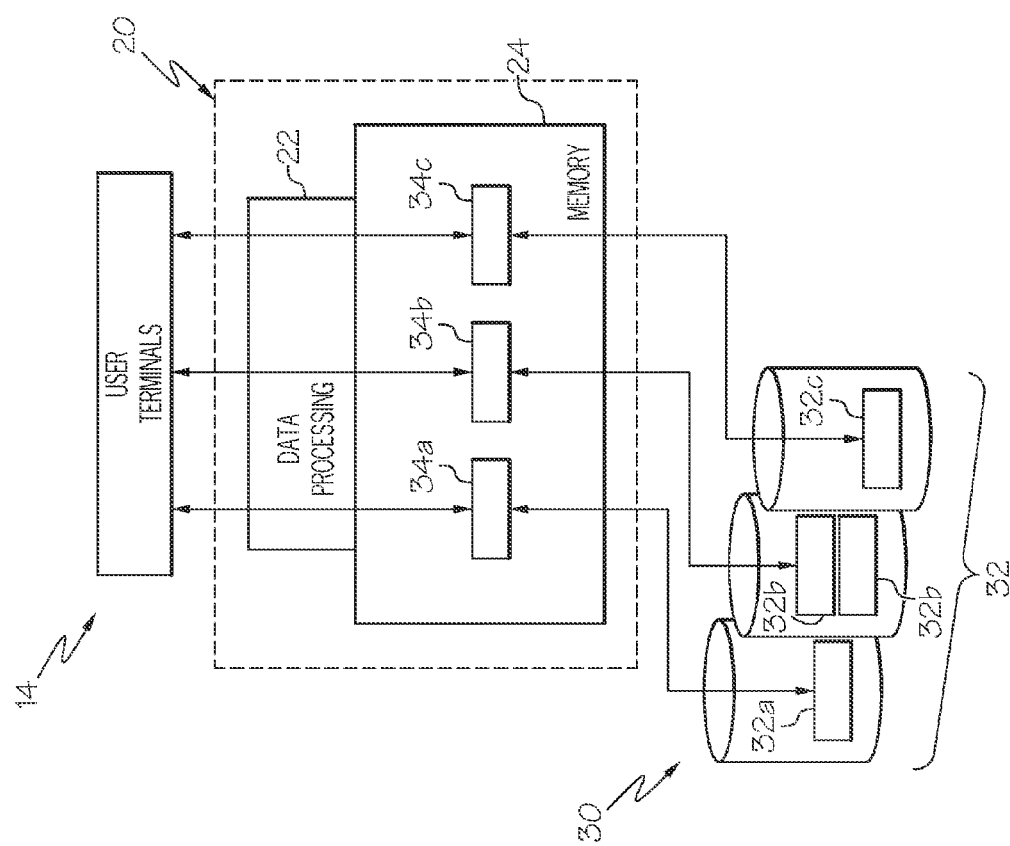
FIG. 2 is a block diagram illustrating how a network server handles requests for data from one or more user terminals.

FIG. 2 illustrates this concept in more detail. Particularly, as seen in FIG. 2, the source storage device 30 stores user data in one or more dataset blocks 32a, 32b, 32c. Collectively, dataset blocks 32a, 32b, 32c comprise a dataset 32. The user terminal 14 issues requests for the data to network server 20, which are handled by a data processing circuit 22. The network server 20 is configured, as is known in the art, to maintain some amount of the user data in an internal cache or local memory 24, illustrated by dataset blocks 34a, 34b, and 34c in FIG. 2. Such data usually comprises data that is accessed often by one or more users, and is stored at the memory 24 to eliminate the delays in retrieving that data across the network 12 and/or 18 (seen in FIG. 1). Therefore, upon receipt of a user request, the data processing circuit 22 is configured to first check the local cache or memory 24 to determine whether the requested data resides in the local memory 24.

If the requested data is already stored in the local memory 24, the data processing circuit 22 retrieves the requested data and returns the data in a response message to user terminal 14. However, if the requested data is not stored locally in memory 24, the data processing circuit 22 retrieves the requested data from the source storage device 30. The requested data may be stored in memory 24, but in any event, is provided to the user terminal 14. Updates to the data are performed in a similar manner. Particularly, if the data to be modified is stored in the memory 24, the data processing circuit 22 modifies that copy of the data, and then synchronizes the data in dataset 32 at the source storage device 30.

Figure 3:
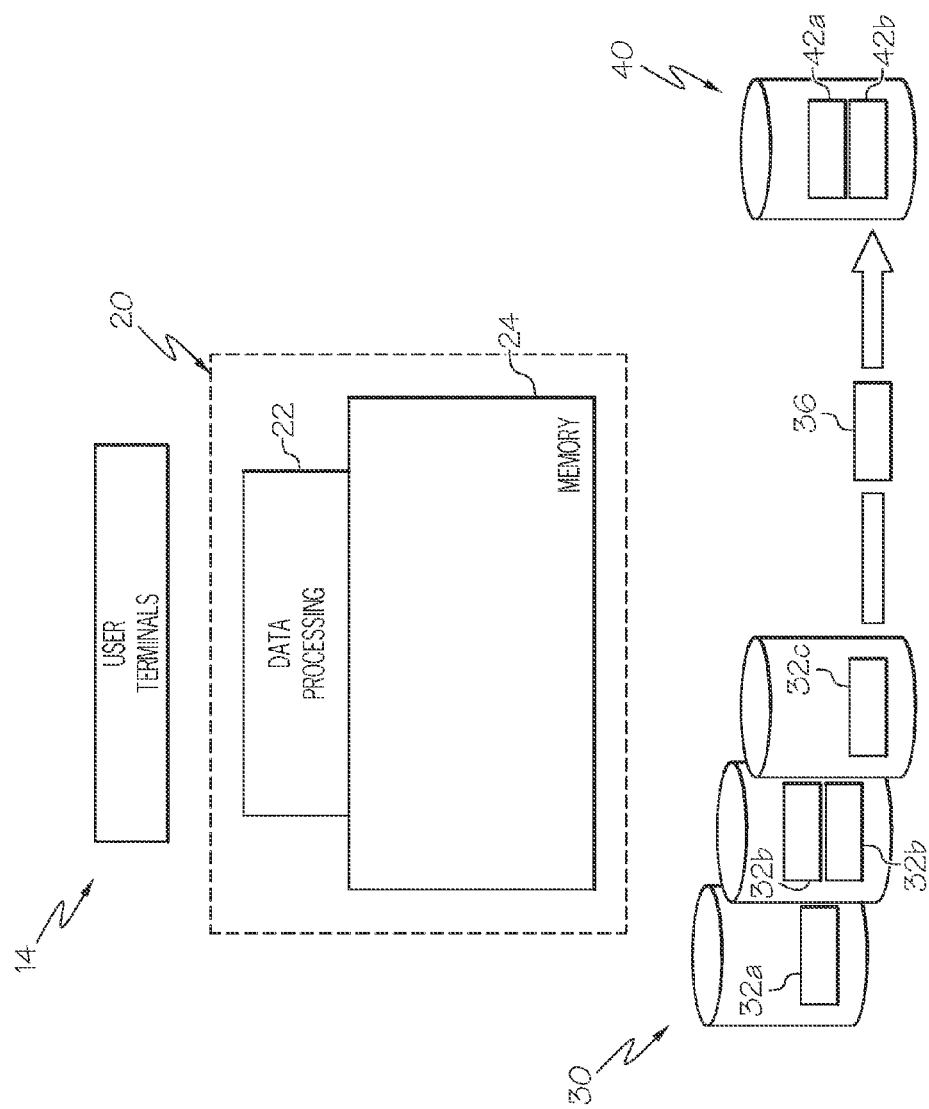
FIG. 3 is a block diagram illustrating the migration of data from a source storage device to a target storage device.
Figure 4:
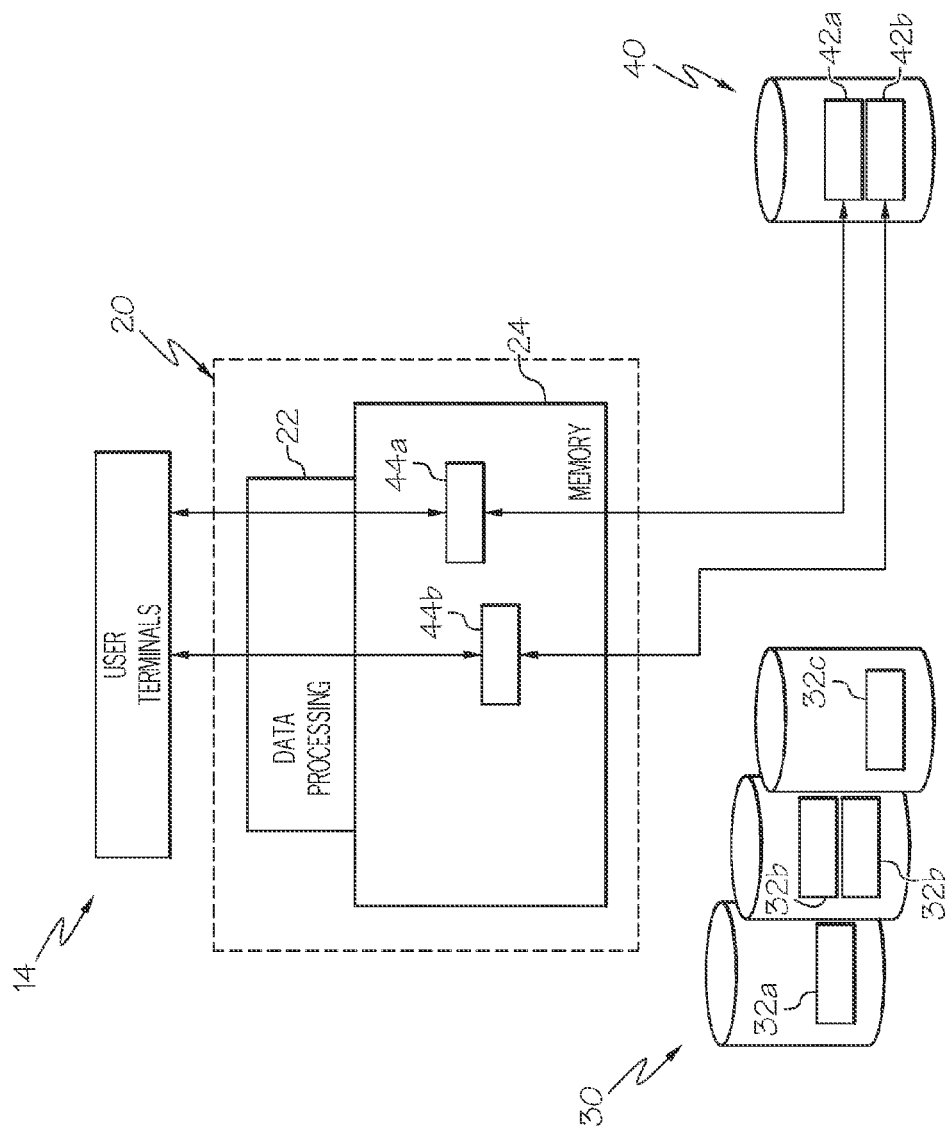
FIG. 4 is a block diagram illustrating how a network server handles requests for data from one or more user terminals after the data has been migrated from a source storage device to a target storage device.

FIGS. 3 and 4 illustrate how a conventional system functions to move a dataset 32 from a source storage device 30 to a target storage device 40. Particularly, as seen in FIG. 3, the dataset 32 is first brought "off-line" such that the data processing circuit 22 will not retrieve or update the data stored therein. Once off-line, the dataset 32 is moved in blocks 36 to the target storage device 40 and stored as dataset 42, comprising extents 42a, 42b. Once the entire dataset 32 has been moved to the target storage device 40, the dataset 42 can be brought "online" so that the user terminals 14 can again begin to retrieve and update the data. Specifically, as seen in FIG. 4, the data processing circuit 22 retrieves dataset blocks 42a, 42b from the and stores that data in the local memory 24 as dataset blocks 44a, 44b. The data processing circuit 22 is then free to utilize that local copy of the data for the user, writing any updates to the dataset blocks 44 back to the corresponding dataset blocks 42 at target storage device 40.

Conventional methods for moving data between a source device and a target device also prevent the user terminals 14 from accessing or interacting with the data in dataset 32 until the migration of the data is complete. Further, with conventional methods, an "in-progress" data migration cannot easily be paused or stopped, or subsequently re-started to continue the migration of a given dataset block after the migration was interrupted.

Figure 5:
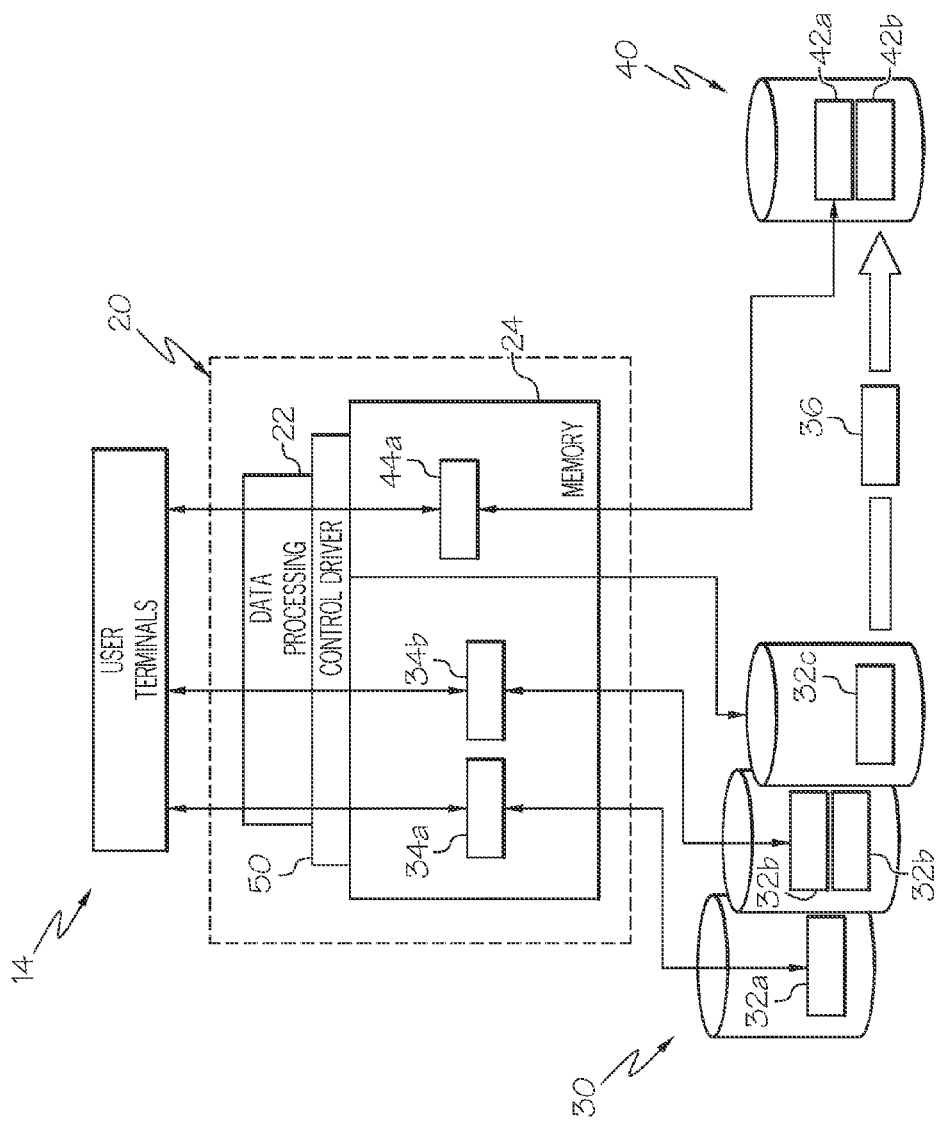
FIG. 5 is a block diagram illustrating a network server configured according to one embodiment of the present disclosure migrating data from a source storage device to a target storage device while handling concurrent data requests from one or more user terminals.

FIG. 5, however, illustrates how embodiments of the present disclosure are able to migrate the blocks of data in dataset 32 from the source storage device 30 to the target storage device 40 without having to place the database "off-line," and while allowing concurrent user access to the data in the dataset 32, 42 regardless of whether that data is currently stored at the source storage device 30 or the target storage device 40.

Specifically, embodiments of the present disclosure provide a control driver 50 that is executed by the processing circuit 22 at network server 20. The control driver 50 configures the processing circuit 22 to perform the migration of data while also concurrently allowing the user terminals 14 to access and update the data. To accomplish this function, the control driver 50 tracks the location of the dataset blocks in dataset 32 as being at either the source storage device 30 or the target storage device 40, and interacts with those dataset blocks (e.g., retrieves data from or modifies/updates the data, etc.) based on that location. More specifically, the control driver 50 intercepts user requests for the data from user terminal 14, and retrieves or modifies the data in dataset 32 if the requested data resides in dataset blocks 32a-32c that have not yet been migrated to target storage device 40. If, however, the requested data resides in dataset blocks that have been migrated to target storage device 40, the control driver 50 retrieves or modifies the data in dataset 42. As stated above, such user access to the datasets 32, 42 occurs concurrently with the migration of other dataset blocks in dataset 32, such as dataset block 36, to the target storage device 40.

FIGS. 6A-6E are flow charts illustrating a method 60 performed at network server 20 for migrating the dataset 32 from a first physical database at the source storage device 30 to a second physical database at the target storage device 40 according to one embodiment. The dataset 32 in this embodiment may comprise data rows of one or more tables (i.e., data areas), or may comprise index entries for the tables (i.e., index areas). In either case, the index areas or data areas are stored as a dataset. Notably, the data areas and index areas are migrated without closing the databases or otherwise causing outages to the end user terminals 14. Rather the first physical database, as well as the second physical database, remain open and in use by the end user terminals 14 during the data migration process.

Method 60 begins with some administrative functions performed by a database administrator (DBA) or other user. Particularly, the DBA first executes a utility application to initialize the target database at the target storage device (box 62). For example, the DBA may execute a database pre-initialization utility application to format the target database at the target storage device and store information regarding the target database in a database directory at the network server. Such information may include, but is not limited to, a DB identifier (DBID) of the target database. Once pre-initialization is complete, the network server receives the command to begin migrating data (box 64). This command may be any command known in the art, but in this embodiment, comprises an "ONLINE AREA MOVE" command that also specifies, as parameters, an identifier of the source dataset 32 to be migrated, as well as the DBID of the database that will have its data migrated to dataset 42.

The network server 20, upon receiving an ONLINE AREA MOVE command, enters a data migration mode and launches execution of a control driver 50. In accordance with the present disclosure, one control driver 50 is instantiated for each dataset that is to be migrated; however, other arrangements are possible. In the data migration mode, the control driver 50 first performs a plurality of pre-processing tasks (box 66) before beginning the migration of the dataset 32 to the dataset 42 on target storage device 40. Such pre-processing may include, but is not limited to, verifying the presence of the source and target storage devices 30, 40, the source dataset 32, the target dataset 42, the readiness of the dataset 32 for the data migration, and the like. Additionally, the control driver 50 will acquire a task area within the network server 20 to perform the migration task and other processing as needed. While the migration task is active, the control driver may utilize information in the task area to periodically output status messages to a display and/or log file indicating the current status of the migration of dataset 32. Once the pre-processing is complete, the control driver 50 can begin migrating the data from dataset 32 to the target dataset 42 on target storage device 40.

Figure 6A:
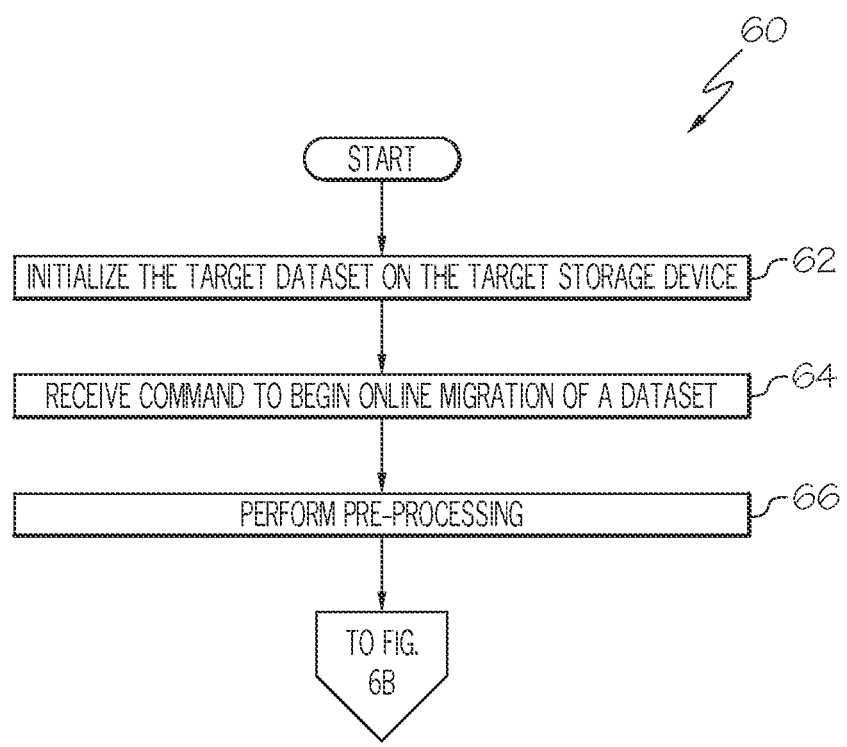
FIGS. 6A-6E are flow diagrams illustrating a method for migrating a source dataset at a physical source storage device to a second physical storage device according to one embodiment of the present disclosure.
Figure 6B:
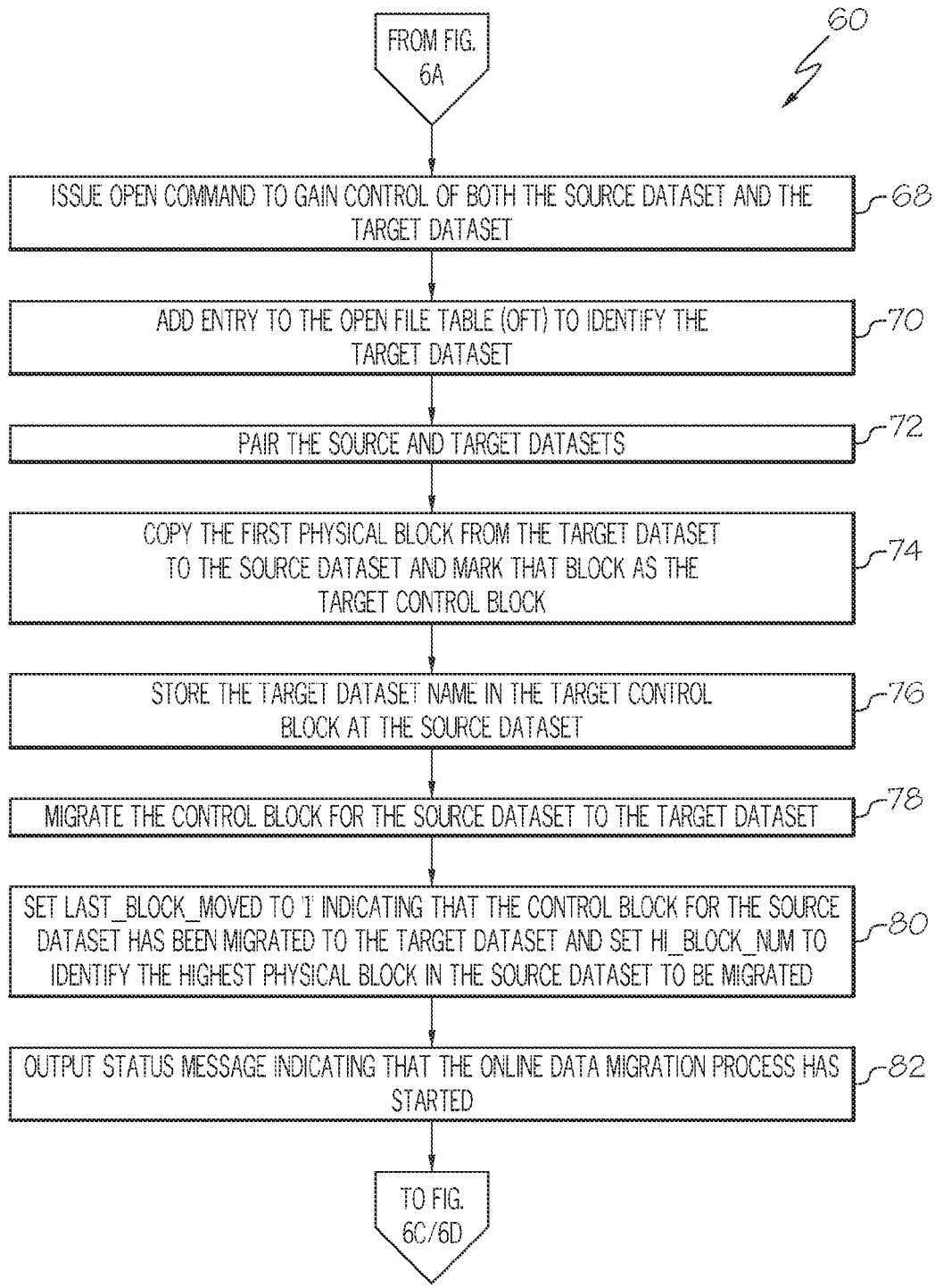

Particularly, as seen in FIG. 6B, the control driver 50 will first issue an open command (i.e., OPEN) to gain control of both the source dataset 32 and the target dataset 42 (box 68). Each dataset that is opened has a memory only control block referred to as an Open File Table (OFT). The OFT contains a first entry identifying the first dataset 32, and is utilized to build read and write "channel programs." Channel programs are high-speed computer programs for retrieving or writing physical dataset blocks to and from the dataset(s) 32, 42. Such programs will be used by the control driver to retrieve data from dataset 32. In addition, however, embodiments of the present disclosure also add an additional second entry to the OFT table in response to the OPEN command (box 70). This second entry represents the target dataset 42, and is utilized by the control driver 50 to determine whether a specific block of data has been migrated to the target dataset 42, or whether that dataset block has not been migrated and is still at the source dataset 32. More specifically, in one embodiment, the second OFT entry points to a new control block comprising the metrics associated with the progress of the dataset migration. Such metrics include, but are not limited to, a LAST_BLOCK_NUMBER and the HI_BLOCK_NUM.

The LAST_BLOCK_NUMBER value identifies the last dataset block that was migrated to the target dataset 42. During the data migration, the control driver 50 will determine which dataset block has the subject data. If the control driver 50 determines that the dataset block ID does not exceed the LAST_BLOCK_NUMBER value, the control driver 50 will direct data requests received from the user terminals 14 such that all data reads and writes are performed on the data at the target dataset 42. Otherwise, the control driver 50 will direct the data requests such that all data reads and writes are performed on the data at the source dataset 32. As stated previously, this embodiment uses a HI_BLOCK_NUM value that is set at the beginning of the dataset migration operation. The HI_BLOCK_NUM value represents the "high use" mark for source dataset blocks. The control driver 50 checks the block identifier for a dataset block currently being migrated against the HI_BLOCK_NUM value during the dataset migration. When the HI_BLOCK_NUM value is reached, the migration of the data (or index) dataset from the source storage device 30 to the target storage device 40 is complete.

Once the OFT entry has been added, the control driver 50 will pair the source and target datasets 32, 42 (box 72). Particularly, the control driver 50 copies the first physical dataset block of the target dataset 42, which is a control block, to the source dataset 32, and marks that control block as being associated with the target dataset 42 (box 74). The control driver 50 then stores the name of the target dataset 42 in the newly copied control block (box 76). If the data migration is ever suspended or interrupted, the control driver 50 can utilize this information, as well as the threshold values in the OFT table, to reopen the source and target datasets 32, 42 as a "pair" and restart the data migration beginning from the dataset block at which the migration was interrupted. This negates the need to restart the entire data migration process from the beginning as is currently performed by conventional data transfer utilities. Additionally, if needed, the control driver 50 may automatically and dynamically extend the target dataset 42 upon reopening the datasets 32, 42 to ensure that the target dataset 42 is at least as large as the source dataset 32.

After pairing the source and target datasets 32, 42, the control driver 50 can begin migrating the dataset blocks from the source dataset 32 to the target dataset 42. Particularly, the control driver 50 will migrate the control block for the source dataset 32 to the target dataset 42 (box 78). The control driver 50 then sets the LAST_BLOCK_MOVED value to '1' to indicate that the control block has been migrated, and then sets the HI_BLOCK_NUM value, as stated above (box 80). As previously stated, these values prevent redundancy in the updating of the datasets 32, 42. Particularly, once a given dataset block has been migrated to the target dataset 42, all future data retrievals and modifications to the data in that dataset block are performed only at the target dataset 42. Additionally, if the data migration process is suspended or interrupted and needs to be restarted, the migration process may continue from the dataset block at which the migration process was interrupted or suspended. Further, even though the migration process (i.e., the data migration mode) may be suspended, the user terminals 14 may still access the data either in the target dataset 42 if the underlying dataset block for the data has been migrated or in the source dataset 32 if it has not been migrated. Next, the control driver 50 outputs a status message to a display and/or a log file, for example, to indicate the start of the online data migration process (box 82).

Figure 6C:
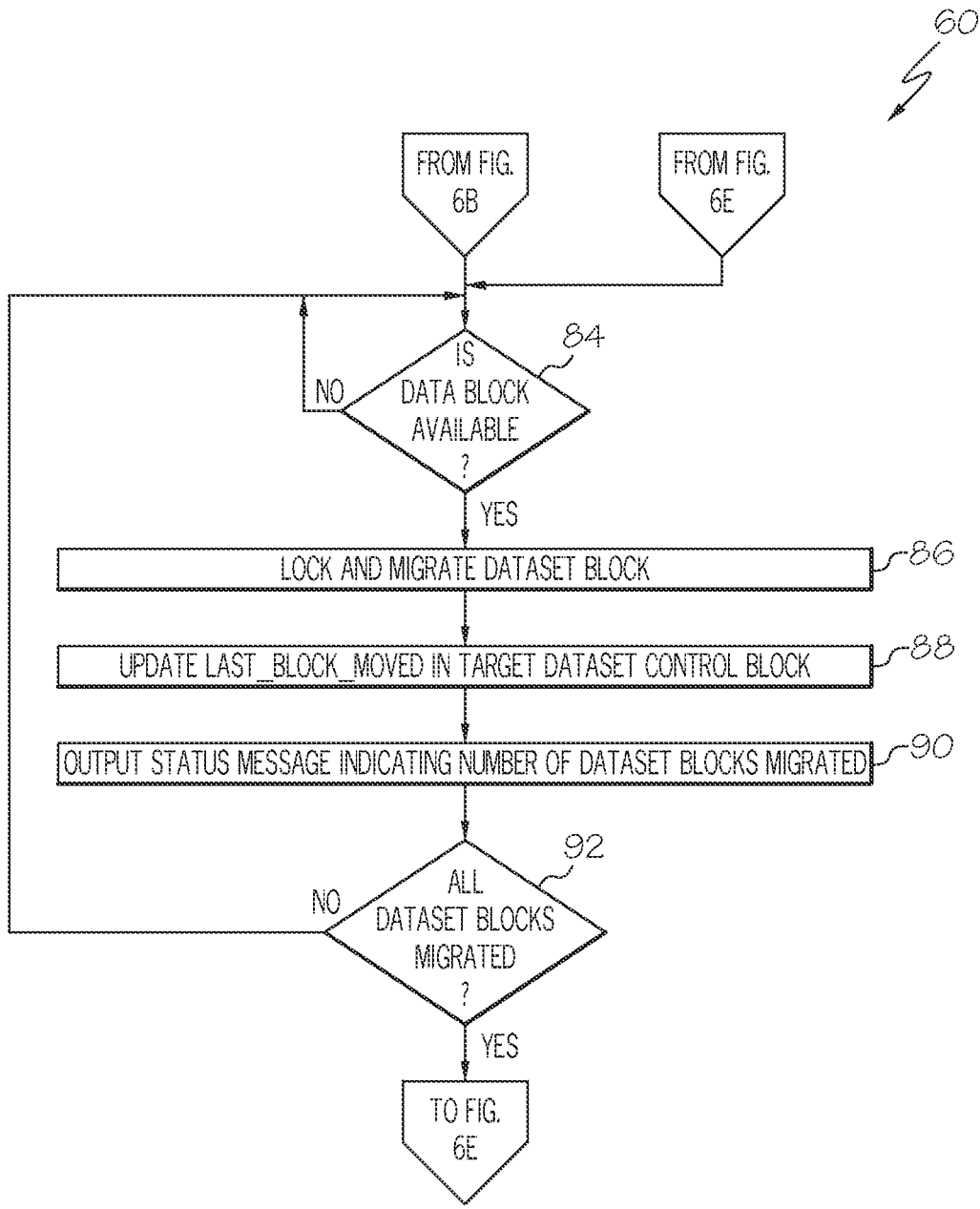

The control driver 50 will handle the migration of the underlying dataset blocks in different ways depending upon whether the dataset 32 is an index area dataset, or data area dataset. FIG. 6C illustrates the continuing method 60 for migrating dataset blocks from an index area. Particularly, index areas may comprise different logical components that may be physically comingled. Therefore, in one embodiment, the control driver 50 simply moves the dataset blocks in an index area one at a time to preserve that arrangement.

More specifically, the control driver 50 will first determine whether a dataset block is available (block 84). If not, for example, if the dataset block is currently being accessed, the control driver 50 will simply wait for the dataset block to become available. Generally, such accesses are very short, and therefore, the delays caused by such waits are minimal. If the dataset block is available, however, the control driver 50 locks the dataset block at the source dataset 32 to prevent access by other processes and copies the contents of the dataset block to the target dataset 42 (box 86). The control driver then updates the LAST_BLOCK_MOVED value, releases the lock on the migrated dataset block (box 88), and outputs a status message indicating the number of dataset blocks that have been migrated (box 90). The frequency of outputting status messages may be varied as needed or decided, but in one embodiment, the status messages are output periodically. The control driver 50 then determines whether all the dataset blocks have been migrated, for example, by comparing the LAST_BLOCK_MOVED value to the HI_BLOCK_NUM value (box 92). If the comparison reveals that not all dataset blocks have been migrated, the control driver 50 repeats the process until all dataset blocks in the index area dataset have been successfully copied to the target dataset 42. Once all dataset blocks in the index area dataset have been migrated to the target dataset 42, however, the control driver 50 performs post-processing to finalize the data migration, as seen later in more detail.

Figure 6D:
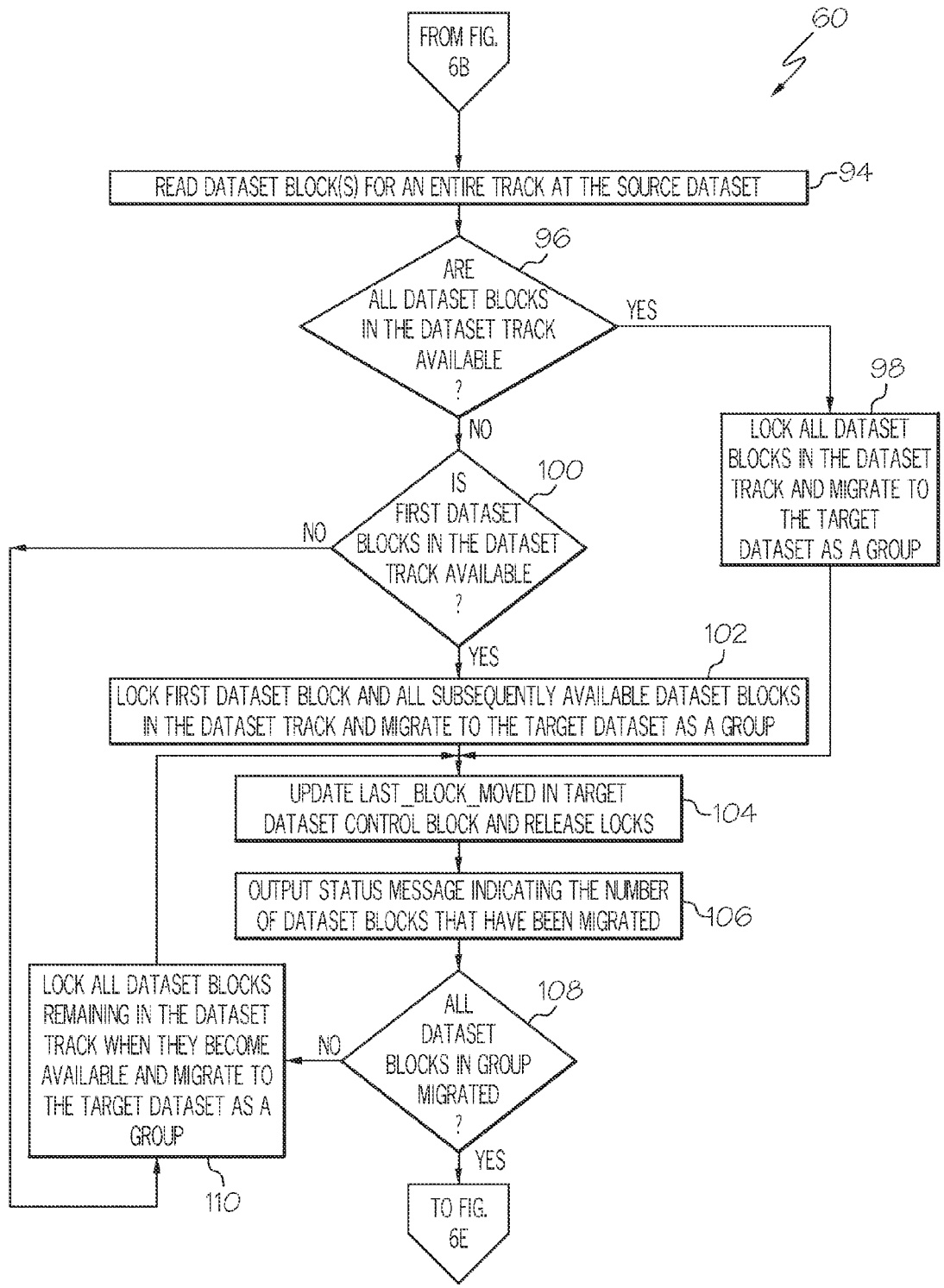

FIG. 6D illustrates the continuing method 60 for migrating dataset blocks from a data area of source dataset 32. As seen in this Figure, this process also occurs repetitively until all dataset blocks in the data area dataset have been migrated to the target dataset 42.

In this embodiment, the control driver 50 will utilize existing database protocols and commands to read a group of dataset blocks known as a dataset track at the source dataset 32 (box 94). If all dataset blocks in the dataset track are available (e.g., none are already locked and being accessed by other processes) (box 96), the control driver 50 will lock all the dataset blocks in the dataset track at the source dataset 32 and copy those dataset blocks as a group to the target dataset 42 (box 98). The control driver 50 will then update the LAST_BLOCK_MOVED value to reflect the last dataset block copied to the target dataset 42 and release the locks (box 104), and output a status message to indicate the number of dataset blocks that have been migrated (box 106).

If one or more of the dataset blocks in the track are not available, however (box 96), the control driver 50 determines whether the first dataset block in the dataset track is available (box 100). If the first dataset block is available, the control driver 50 locks that first dataset block and all subsequent dataset blocks in the dataset track that are also available, and migrates or transfers those dataset blocks to the target dataset 42 as a group (box 102). Once migrated, the control driver 50 updates the LAST_BLOCK_MOVED value, releases the locks (box 104), and outputs a status message (box 106) indicating the number of dataset blocks that have been migrated.

Thereafter, the control driver 50 determines whether all dataset blocks in the group have been migrated (box 108). If not, the control driver 50 locks all remaining dataset blocks in the dataset track as they become available (e.g., as the other processes release their lock) and migrates or transfers those remaining dataset blocks to the target dataset 42 as a group (box 110), with the control driver 50 updating the LAST_BLOCK_MOVED value and releasing the locks (box 104), and outputting a status message (box 106), as previously stated. This process continues (boxes 104, 106, 108) until all dataset blocks in the dataset track have been copied over to the target dataset 42 (box 108).

Figure 6E:
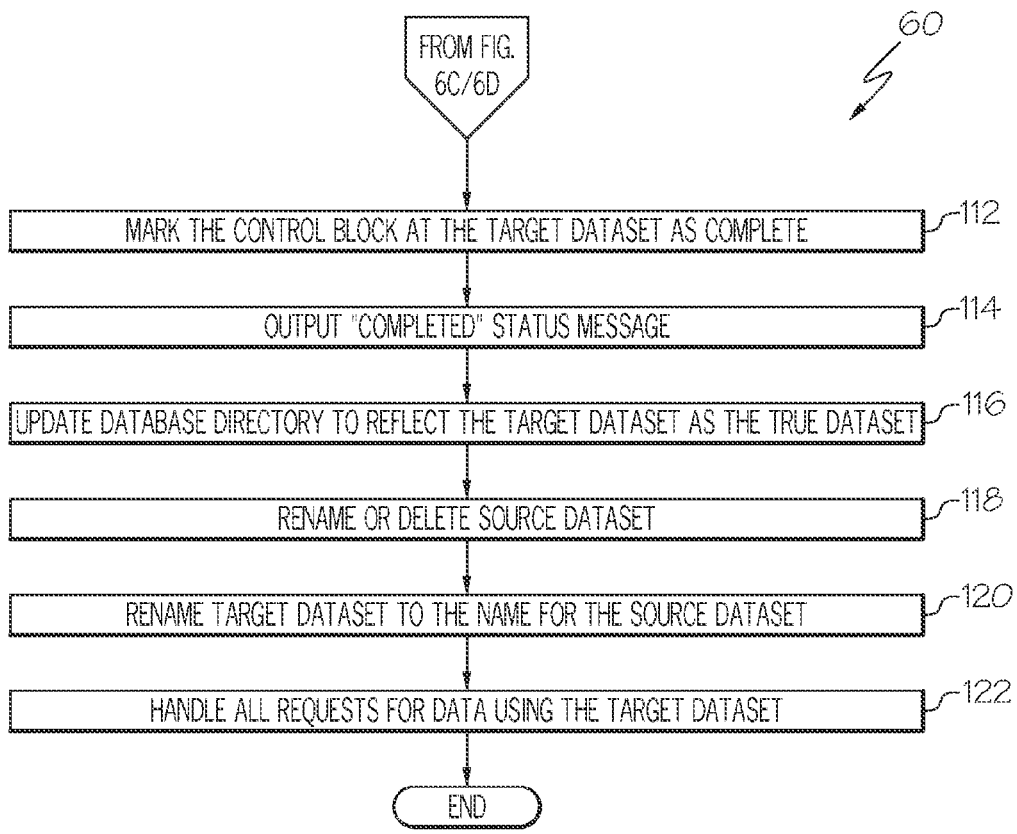

If the control driver 50 determines that the first dataset block in the track is not available, however (box 100), control driver 50 will lock all the dataset blocks in the dataset track that are available (box 110) and migrate those dataset blocks to the target dataset 42 as a group. As above, this process of locking the dataset blocks that are available and moving them as a group (box 110), updating the LAST_BLOCK_MOVED value, releasing the locks (box 104), and outputting the status message (box 106) continues until all dataset blocks in the group have been migrated (box 108). FIG. 6E is a flow chart illustrating the post-processing of method 60. This part of the method is performed by the network server 20 after the dataset blocks of the index areas (FIG. 6C) and/or the data areas (FIG. 6D) have been migrated.

As seen in FIG. 6E, control driver 50 performs this processing once all the dataset blocks in the dataset track have been migrated. Particularly, control driver 50 marks the control block at the target dataset 42 as complete (box 112) and outputs a "completed" status message (box 114). The control driver 50 then updates the database directory to reflect that the target dataset 42 is now the "active" dataset (box 116), and renames, or deletes, the source dataset 32 (box 118). Control driver 50 also renames the target dataset 42 to be the original name used for the source dataset 32 (box 120). This allows processes external to the database to interact with the target dataset 42 using the original name for the source dataset 32. Thereafter, all data requests from user terminals 14 and other user processes will be directed to the data at the target dataset 42 (box 122).

Figure 7:
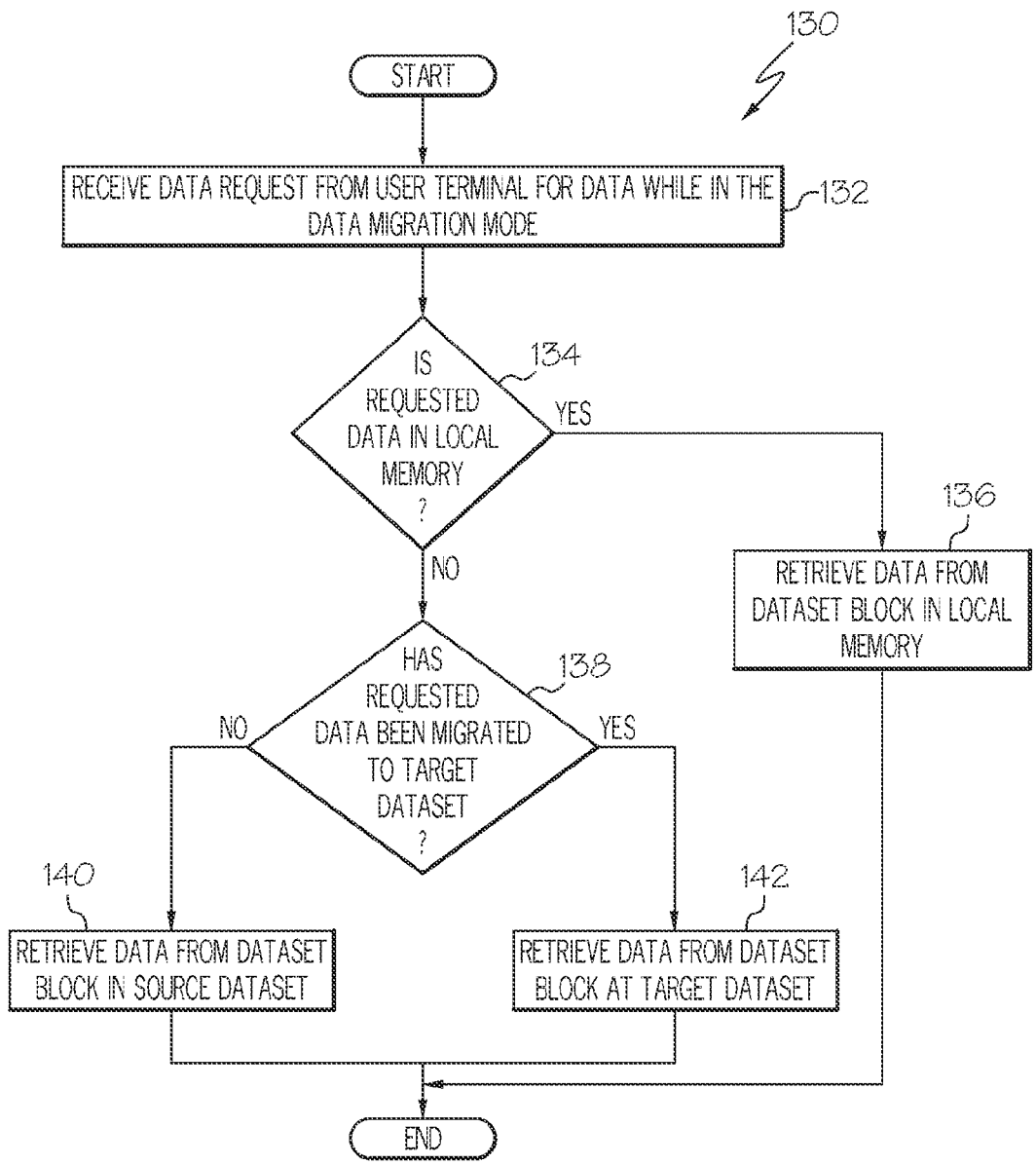
FIG. 7 is a flow diagram illustrating a method for retrieving data from a dataset while the dataset is being migrated from a source storage device to a target storage device according to one embodiment.

FIG. 7 is a flow chart illustrating how the control driver 50 at the network server functions to retrieve data while in the data migration mode according to one embodiment. As seen in FIG. 7, method 130 begins with the control driver 50 receiving a request for data from a user terminal 14 (box 132). In response, the control driver 50 will first determine whether the requested data is in its local memory cache (box 134). If so, the control driver 50 directs the user request to retrieve the data from the local cached memory (box 136). If not, however, the control driver will determine whether the requested data is currently in a dataset block stored at the source dataset 32 or the target dataset 42 (box 138). If the data is at the source dataset 32, the control driver 50 will direct the user request to retrieve the data from the source dataset 32 (box 140). Otherwise, the control driver 50 will direct the user request to retrieve the requested data from the target dataset 42 (box 142). Once retrieved, the requested data is sent back to the requesting user terminal 14 and the process ends.

There are different ways to determine the current memory location for any given piece of requested data. In one embodiment, for example, the control driver utilizes the information in a special control block stored in the database directory at the network server 20. Particularly, these special control blocks are referred to as Buffer Directory Entries (BDEs). The BDE has a pointer to the OFT to facilitate input/output procedures. In the context of the present disclosure, the OFT is updated to reflect the fact that a given dataset block has been stored in cache memory. Thus, once a given dataset block is in the local cache memory, the BDE will point to the correct entry in the OFT indicating the current memory location of the dataset block. For those dataset blocks not in cache memory, however, the control driver 50 follows a different approach to determine whether the dataset block lies in the source dataset 32 or the target dataset 42.

In one embodiment, for example, the control driver 50 will detect that the OFT contains two entries. As stated previously, the first entry is associated with the source dataset 32, while second entry is associated with the target dataset 42. Based on this discovery, the control driver 50 will interrogate the special online move control block stored at the source dataset 32 to read the LAST_BLOCK_MOVED value. This will identify whether the BDE entry should point to the first entry in the OFT table (and thus, the source dataset 32), or the second entry in the OFT table (and thus, the target dataset 42). Based on this entry, the control driver 50 will be able to direct the user request to retrieve the data from the appropriate location.

Figure 8:
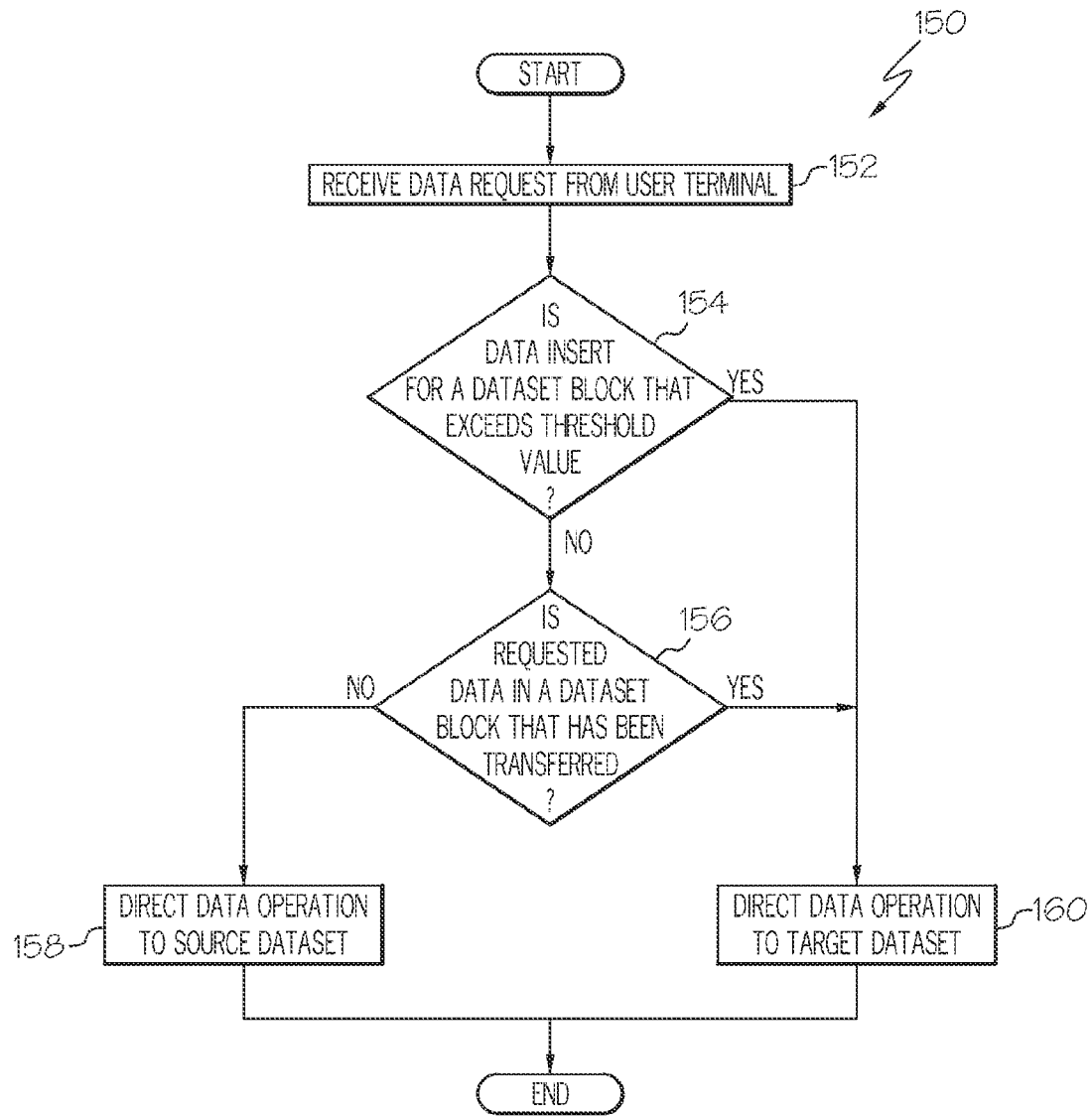
FIG. 8 is a flow chart illustrating a method for updating data in a dataset concurrently with the dataset being migrated from a source storage device to a target storage device according to one embodiment.

FIG. 8 is a flow chart illustrating a method 150 by which the control driver 50 of the present disclosure adds or modifies data while in the data migration mode. Method 150 begins with the control driver 50 receiving a request from the user terminal 14 to modify the data (box 152). Generally, the request comprises a message that includes the particular modifications to the data. The control driver 50 may first determine whether the request is to insert data to a dataset block that exceeds the HI_BLOCK_NUM value (box 154). If so, the control driver 50 will simply direct the request to the target dataset 42 (box 160). Directing the request in these situations avoids the overhead and processing concerns by avoiding the need to first modify the source dataset 32, and then subsequently copy those modifications to the target dataset 42. If not, however, the control driver 50 will direct the request to either the source dataset 32 or the target dataset 42 based on the current memory location of the desired dataset block. In one embodiment, for example, the control driver 50 determines, as previously described, whether the data to be modified is in the local memory cache, or whether the data resides at the source dataset 32, or target dataset 42 (box 156). If the data is at the source dataset 32, control driver 50 directs the request to update the data at the source dataset 32 (box 158). Otherwise, the control driver directs the request to update the data at the target dataset 42 (box 160).

In some cases, a copy of the data to be updated is located in the local cache memory at the network server 20. In these cases, the control driver 50 may be configured to hold the updated dataset block for some time period and then write the changes back to the dataset 32 or 42, depending on whether the appropriate dataset block has already been migrated to the target dataset 42. Specifically, if the data has already been copied to dataset 42, the control driver 50 will update the target dataset 42. Otherwise, the control driver will update the source dataset 32.

Figure 9:
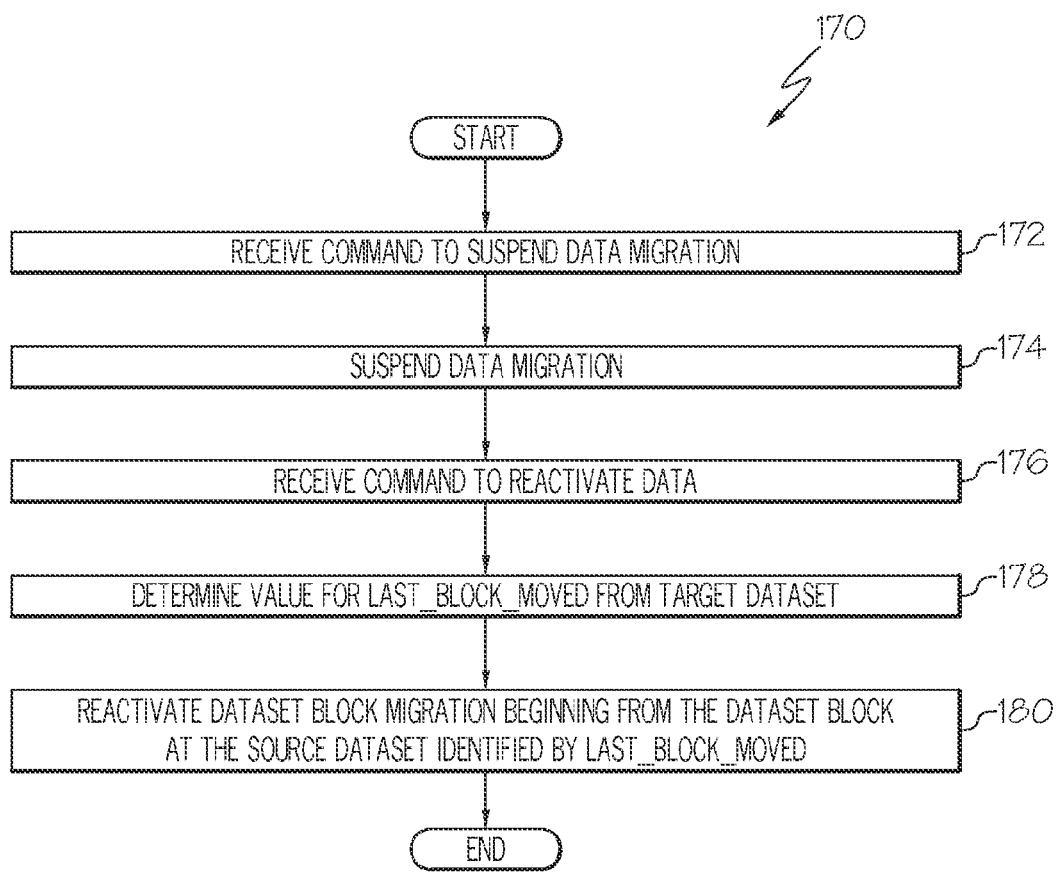
FIG. 9 is a flow diagram illustrating the suspension, and reactivation of, a data migration process according to one embodiment of the present disclosure.

FIG. 9 is a flow diagram illustrating how the control driver 50 temporarily suspends, and then reactivates, the data migration process. As seen in FIG. 9, method 170 begins with the control driver 50 receiving a command from the user terminal 14 to temporarily suspend the migration of data from the source dataset 32 to the target dataset 42 (box 172). The command may be, for example, "SUSPEND ONLINE DATA MOVE." In response, the control driver temporarily suspends the data migration (box 174). In one embodiment, the control driver 50 finishes the migration of a current dataset block and ensures that the LAST_BLOCK_MOVED reflects that dataset block before suspending the migration of the dataset block.

Subsequently, when the control driver 50 receives a command to restart the suspended migration (e.g., "RESTART ONLINE DATA TRANSFER"), the control driver 50 puts the network server 20 back into the data migration mode (box 176), and reads the LAST_BLOCK_MOVED value to determine the point at which to restart the data migration from the source dataset 32 (box 178). The control driver 50 then restarts the data migration from the next dataset block based on that value (box 180).

Figure 10:
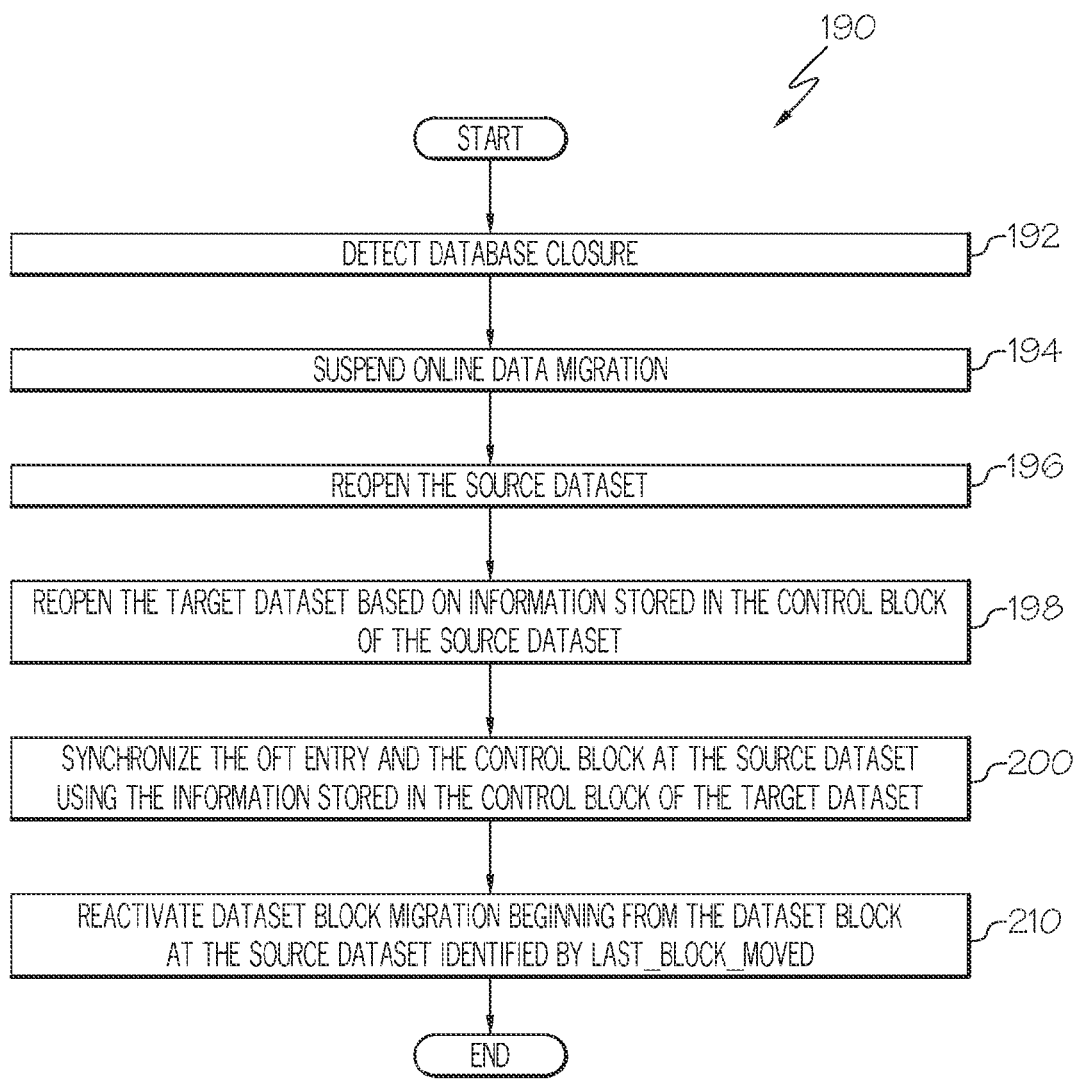
FIG. 10 is a flow chart illustrating a method for suspending and reactivating a data migration process responsive to detecting a closure of the database according to one embodiment.

FIG. 10 is a flow chart that illustrates a method 190 in which the control driver 50 suspends and restarts the data migration in response to detecting a database closure. The closure may be unintentionally caused, for example, by a failure of the database, or intentionally caused by the DBA.

As seen in FIG. 10, the control driver 50 detects the database closure (box 192), and in response, suspends the data migration process (box 194). For intentional closures, the control driver 50 may first finish the write of a current dataset block to the target dataset 42; however, for closures caused by power loss or machine failures, for example, the control driver may not be able to finish the current write.

At some point, the control driver will once again detect that the source dataset is being re-opened (box 196) and reopen the source and target datasets 32, 42. The control driver 50 may reopen the datasets 32, 42 using the LAST_BLOCK_MOVED value previously described (box 198), and then place the network server 20 into the data migration mode. In this mode, the control driver 50 would be configured to synchronize the OFT entries and the control block at the source dataset 32 using the information stored in the control block at the target dataset 32 (box 200), and reinstate the data migration beginning at the dataset block identified by the LAST_BLOCK_MOVED value (box 210).

Figure 11:
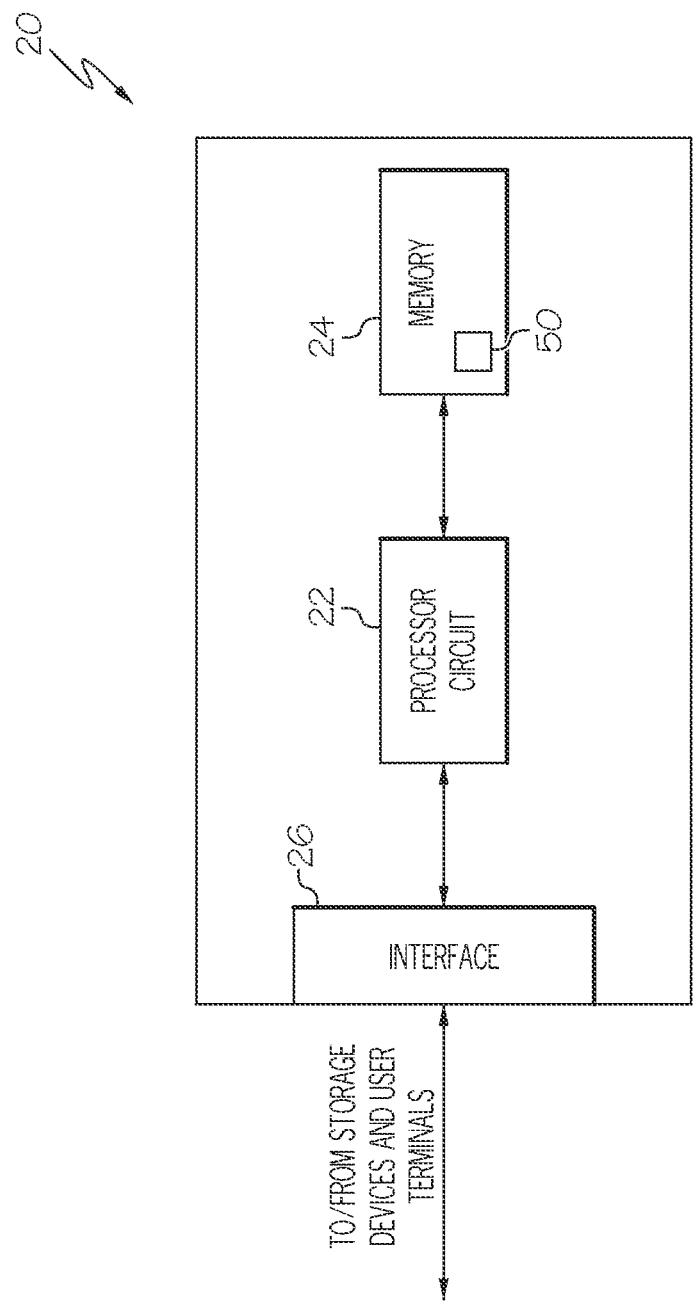
FIG. 11 is a block diagram illustrating a network server configured to migrate data from a source storage device to a target storage device while concurrently handling data requests from one or more user terminals according to one embodiment of the present disclosure.

FIG. 11 is a block diagram illustrating some functional components of a network server 20 configured according to one embodiment of the present disclosure. Server 20 comprises one or more computing devices configured to communicate data and information between one or more user terminals 14 and one or more storage devices 30, 40 via one or more IP networks (e.g., IP network 12 and IP network 18). While FIG. 11 illustrates some of the components present on network server 20, those of ordinary skill in the art will readily appreciate that network server 20 may or may not comprise additional functional components not expressly seen in the figures.

As seen in FIG. 11, network server 20 comprises a processor circuit 22, a memory circuit 24, and a communications interface 26. The processor circuit 22 may be implemented by one or more microprocessors, hardware, firmware, or a combination thereof, and generally controls the operation and functions of server 20 according to logic and instructions stored in the memory circuit 24. Such operations and functions include, but are not limited to, communicating with the user terminals 14 and with the datasets 32, 42 stored at the source and target data storage devices 30, 40, and migrating dataset blocks in a data migration mode from the source dataset 32 to the target dataset 42 while allowing for concurrent access to the data being migrated by other processes, as previously described. To accomplish these functions, the processor circuit 22 executes the control driver 50 as previously described.

The memory circuit 24 may comprise any non-transitory, solid state memory or computer readable media known in the art. Suitable examples of such media include, but are not limited to, ROM, DRAM, Flash, or a device capable of reading computer-readable media, such as optical or magnetic media. The memory circuit 24 stores the control driver 50 that when executed by the processor circuit 22, controls server 20 to perform the functions previously described.

The communications interface circuit 36 may comprise any communication interface known in the art that enables server 20 to communicate data and information with the user terminal 14 via IP network 12, and with the storage devices 30, 40 via IP network 18. For example, the communications interface 26 in one embodiment comprises an interface card that operates according to any of standards that define the well-known Ethernet® protocol. However, other protocols and standards are also possible with the present disclosure.

The present embodiments may, of course, be carried out in other ways than those specifically set forth herein without departing from essential characteristics of the disclosure.

For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method performed at a network server, the method comprising:
   in a data migration mode, migrating a plurality of dataset blocks from a source storage device to a target storage device, wherein the source and target storage devices are communicatively connected to the network server via a communications network;
   receiving a data request while migrating the plurality of dataset blocks;
   determining a current memory location for a dataset block comprising requested data responsive to receiving the data request, wherein the current memory location is at the source storage device if the dataset block has not been migrated, and at the target storage device if the dataset block has been migrated;
   retrieving the dataset block comprising the requested data from the current memory location while migrating the plurality of dataset blocks; and
   wherein migrating the plurality of dataset blocks from the source storage device to the target storage device comprises:
      determining whether the plurality of dataset blocks are associated with a data area dataset or an index area dataset;
      migrating the plurality of dataset blocks according to a first migration process responsive to determining that the plurality of dataset blocks are associated with an index area dataset; and
      migrating the plurality of dataset blocks according to a second migration process responsive to determining that the plurality of dataset blocks are associated with a data area dataset, wherein the second migration process is different from the first migration process.

2. The method of claim 1 wherein the first migration process comprises:
   determining whether a first dataset block is available for migration to the target storage device;
   if the first dataset block is currently available for migration, migrating the first dataset block to the target storage device; and
   if the first dataset block is not currently available for migration:
      temporarily suspending migrating the plurality of dataset blocks until the first dataset block becomes available for migration to the target storage device; and
      migrating the first dataset block to the target storage device responsive to detecting that the first dataset block is available for migration to the target storage device.

3. The method of claim 1 wherein the second migration process comprises migrating dataset blocks not currently in use to the target storage device prior to migrating dataset blocks that are currently in use to the target storage device.

4. The method of claim 1 further comprising updating the dataset block at the current memory location with updated data while operating in the data migration mode.

5. The method of claim 1 further comprising:
   maintaining control information indicating the current memory location of each dataset block; and
   updating the control information for the dataset block responsive to completing the migration of the dataset block to the target storage device.

6. The method of claim 1 wherein the source storage device comprises a plurality of datasets, each of which comprises a corresponding plurality of dataset blocks, and wherein the method further comprises instantiating a control driver at the network server for each dataset, wherein each instance of the control driver is configured to control the migration of the plurality of dataset blocks in a corresponding dataset to the target storage device.

7. The method of claim 1 further comprising:
   storing a progress indicator that identifies the dataset block currently being migrated to the target storage device;
   suspending the migration of the plurality of dataset blocks responsive to detecting a fault condition; and resuming the migration of the plurality of dataset blocks based on the progress indicator responsive to detecting that the fault condition has been corrected.

8. The method of claim 7 wherein resuming the migration of the plurality of dataset blocks comprises:
determining whether a first control driver at the network server is operative to control the migration of the plurality of dataset blocks to the target storage device responsive to detecting that the fault condition has been corrected; and
resuming the migration of the plurality of dataset blocks utilizing the first control driver if the first control driver is operative to control the migration of the plurality of dataset blocks to the target storage device.

9. The method of claim 8 wherein if the first control driver is not operative to control the migration of the plurality of dataset blocks to the target storage device, the method further comprises:
instantiating a second control driver at the network server to control the migration of the plurality of dataset blocks to the target storage device; and
resuming the migration of the plurality of dataset blocks based on progress indicator and utilizing the second control driver.

10. A network server comprising:
a communications interface circuit configured to communicate data with a source storage device, a target storage device, and a terminal via a communications network; and
a processor circuit, operable in a data migration mode, configured to:
determine whether a plurality of dataset blocks to be migrated from the source storage device to the target storage device are associated with data or an index area;
migrate the plurality of dataset blocks from the source storage device to the target storage device according to a first migration process responsive to determining that the plurality of dataset blocks are associated with an index area;
migrate the plurality of dataset blocks from the source storage device to the target storage device according to a second migration process responsive to determining that the plurality of dataset blocks are associated with a data area, wherein the second migration process is different from the first migration process;
receive a data request while migrating the plurality of dataset blocks in the data migration mode;
determine a current memory location for a dataset block comprising requested data responsive to receiving the data request, wherein the current memory location is at the source storage device if the dataset block has not been migrated, and at the target storage device if the dataset block has been migrated; and
retrieve the dataset block comprising the requested data from the current memory location while migrating the plurality of dataset blocks in the data migration mode.

11. The network server of claim 10 wherein to migrate the plurality of dataset blocks according to the first migration process, the processor circuit is further configured to:
determine whether a first dataset block is available for migration to the target storage device;
if the first dataset block is currently available for migration, migrate the first dataset block to the target storage device; and
if the first dataset block is not currently available for migration:
temporarily suspend migrating the plurality of dataset blocks until the first dataset block becomes available for migration to the target storage device; and
migrate the first dataset block to the target storage device responsive to detecting that the first dataset block is available for migration to the target storage device.

12. The network server of claim 10 wherein to migrate the plurality of dataset blocks according to the second migration process, the processor circuit is further configured to migrate dataset blocks not currently in use to the target storage device prior to migrating dataset blocks that are currently in use to the target storage device.

13. The network server of claim 10 wherein the request for data comprises an update request that includes updated data, and wherein the processor circuit is further configured to update the dataset block at the current memory location with the updated data while operating in the data migration mode.

14. The network server of claim 10 wherein the processor circuit is further configured to:
maintain control information indicating the current memory location of each dataset block; and
update the control information for the dataset block responsive to completing the migration of the dataset block to the target storage device.

15. The network server of claim 10 wherein the source storage device comprises a plurality of datasets, each dataset comprising a corresponding plurality of dataset blocks, and wherein the processing circuit is further configured to instantiate a control driver for each dataset, wherein each instance of the control driver is configured to control the migration of the plurality of dataset blocks for a corresponding dataset.

16. The network server of claim 10 wherein the processor circuit is further configured to:
store a progress indicator that identifies the dataset block currently being migrated to the target storage device;
suspend the migration of the plurality of dataset blocks responsive to detecting a fault condition; and
resume the migration of the plurality of dataset blocks based on the progress indicator responsive to detecting that the fault condition has been corrected.

17. The network server of claim 16 wherein the processor circuit is further configured to:
determine whether a first control driver at the network server is operative to control the migration of the plurality of dataset blocks to the target storage device responsive to detecting that the fault condition has been corrected;
if the first control driver is operative to control the migration of the plurality of dataset blocks to the target storage device, resume the migration of the plurality of dataset blocks utilizing the first control driver; and
if the first control driver is not operative to control the migration of the plurality of dataset blocks to the target storage device:
instantiate a second control driver at the network server to control the migration of the plurality of dataset blocks to the target storage device; and
resume the migration of the plurality of dataset blocks based on progress indicator and utilizing the second control driver.

18. A computer program product comprising a computer-readable medium configured to store a control application that, when executed by a processing circuit on a computing device, configures the processing circuit to operate in a data migration mode to:
- determine whether a plurality of dataset blocks to be migrated from a source storage device to a target storage device are associated with data or an index area;
- migrate the plurality of dataset blocks from the source storage device to the target storage device according to a first migration process responsive to determining that the plurality of dataset blocks are associated with an index area;
- migrate the plurality of dataset blocks from the source storage device to the target storage device according to a second migration process responsive to determining that the plurality of dataset blocks are associated with a data area, wherein the second migration process is different from the first migration process;
- receive a data request while migrating the plurality of dataset blocks in the data migration mode;
- determine a current memory location for a dataset block comprising requested data responsive to receiving the data request, wherein the current memory location is at the source storage device if the dataset block has not been migrated, and at the target storage device if the dataset block has been migrated; and
- retrieve the dataset block comprising the requested data from the current memory location while operating in the data migration mode.

\* \* \* \* \*